United States Patent [19]

Sato et al.

[11] Patent Number: 4,775,885

[45] Date of Patent: Oct. 4, 1988

[54] COLOR FILTER ARRANGEMENT FOR CCD IMAGER

[75] Inventors: Yasushi Sato; Masuko Muto, both of Kanagawa, Japan

[73] Assignee: Sony Corporation, Tokyo, Japan

[21] Appl. No.: 53,675

[22] Filed: May 26, 1987

[30] Foreign Application Priority Data

May 26, 1986 [JP] Japan ................................ 61-120691

[51] Int. Cl.[4] ........................ H04N 9/07; H04N 9/077

[52] U.S. Cl. .......................................... 358/44; 358/43

[58] Field of Search .............................. 358/44, 43, 41

[56] References Cited

U.S. PATENT DOCUMENTS

| | | | |
|---|---|---|---|
| Re. 32,492 | 9/1987 | Takemura | 358/44 |
| 4,245,241 | 1/1981 | Sato et al. | 358/44 |
| **4,246,601** | **1/1981** | Sato et al. | 358/44 X |
| 4,477,832 | 10/1984 | Takemura | 358/44 |
| 4,652,911 | 3/1987 | Teranishi et al. | 358/44 |
| 4,670,777 | 6/1987 | Ishikawa et al. | 358/44 X |
| 4,710,804 | 12/1987 | Ide | 358/44 X |

FOREIGN PATENT DOCUMENTS

| | | | |
|---|---|---|---|
| 52-007627 | 1/1977 | Japan | 358/44 |
| 56-019289 | 2/1981 | Japan | 358/44 |
| 57-212888 | 12/1982 | Japan | 358/44 |

*Primary Examiner*—James J. Groody
*Assistant Examiner*—E. Anne Faris
*Attorney, Agent, or Firm*—Hill, Van Santen, Steadman & Simpson

[57] ABSTRACT

A solid state image sensor of a frequency interleave system, operable in the field storage mode, has color filters formed on a picture element portions of a solid state image sensing element. The filters are selected to have such spectral characteristics as to reduce the difference in luminance sensitivities to white light among the picture element portions, resulting in reduced luminance aliasing distortion. Demodulated components of an interleaved signal are generated in the form of signals which are nearly color difference signals, enabling simplification of the signal processing circuit.

7 Claims, 8 Drawing Sheets

| $A_{11}$ (Yellow) G+R | $A_{12}$ (Green) G |
|---|---|
| $A_{21}$ (Cyan) B+G | $A_{22}$ (Green) G |
| $A_{31}$ (Yellow) G+R | $A_{32}$ (Green) G |
| $A_{41}$ (Green) G | $A_{42}$ (Cyan) B+G |

$S_1$, $S_3$ (left); $S_2$ R+B, $S_4$ R+B (right)

| $A_{11}$ (White) B+G+R | $A_{12}$ (Cyan) B+G |
|---|---|
| $A_{21}$ (White) B+G+R | $A_{22}$ (Yellow) G+R |
| $A_{31}$ (White) B+G+R | $A_{32}$ (Cyan) B+G |
| $A_{41}$ (Yellow) G+R | $A_{42}$ (White) B+G+R |

$S_1$, $S_3$ (left); $S_2$, $S_4$ (right)

| | |
|---|---|
| $A_{11}$ (Cyan) B+G | $A_{12}$ (Green) G |
| $A_{21}$ (White) B+G+R | $A_{22}$ (Green) G |
| $A_{31}$ (Cyan) B+G | $A_{32}$ (Green) G |
| $A_{41}$ (Cyan) B+G | $A_{42}$ (Yellow) G+R |

$S_1$ { rows 1–2 }, $S_2$ { rows 1–2 }, $S_3$ { rows 3–4 }, $S_4$ { rows 3–4 }, 1

| | |
|---|---|
| $A_{11}$ (White) B+G+R | $A_{12}$ (Yellow) G+R |
| $A_{21}$ (White) B+G+R | $A_{22}$ (Green) G |
| $A_{31}$ (White) B+G+R | $A_{32}$ (Yellow) G+R |
| $A_{41}$ (Cyan) B+G | $A_{42}$ (Yellow) G+R |

$S_1$ { rows 1–2 }, $S_2$ { rows 1–2 }, $S_3$ { rows 3–4 }, $S_4$ { rows 3–4 }, 1

FIG. 3A
FIG. 3B
FIG. 3C
FIG. 3D
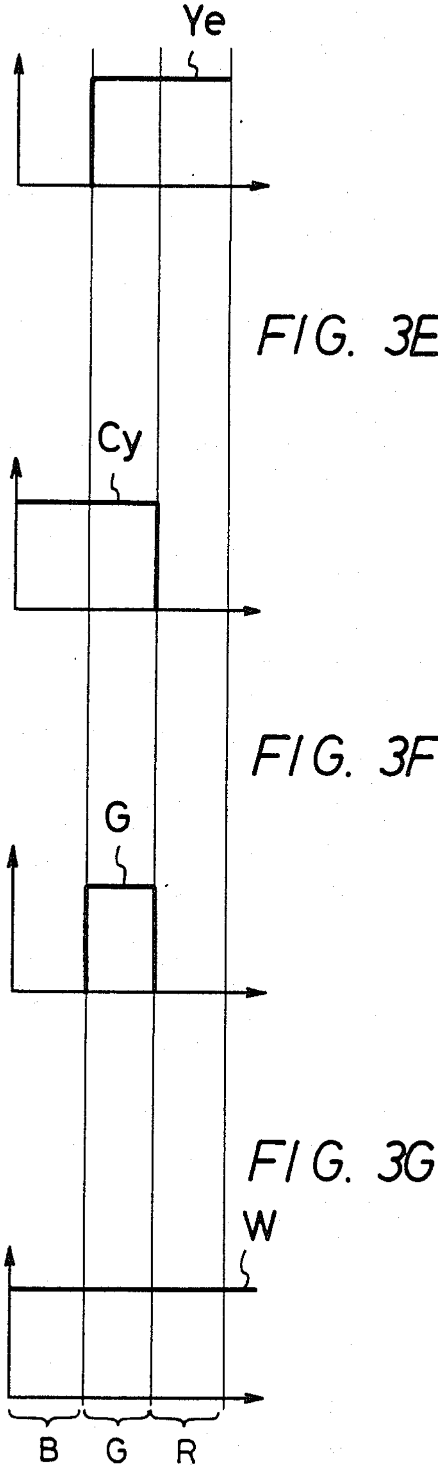
FIG. 3E
FIG. 3F
FIG. 3G
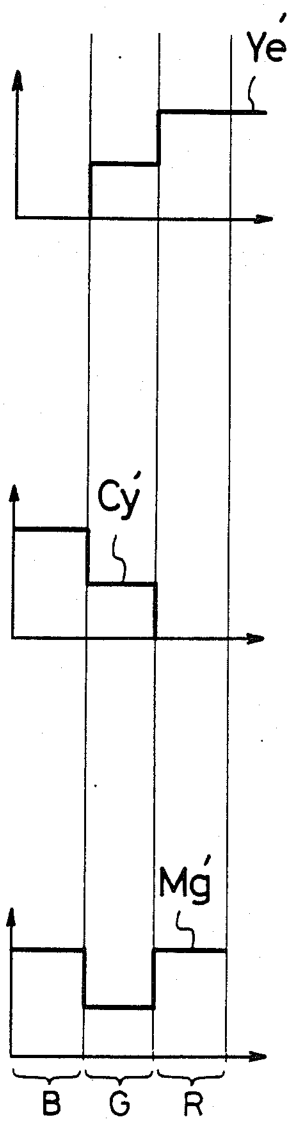

$S_1 \Big\{$
| $A_{11}$ (Cy') ½G+B | $A_{12}$ (Green) G |
|---|---|
| $A_{21}$ (Mg') B+½G+R | $A_{22}$ (Green) G |
$\Big\} S_2$ $S_3 \Big\{$
| $A_{31}$ (Cy') ½G+B | $A_{32}$ (Green) G |
|---|---|
| $A_{41}$ (Cyan) B+G | $A_{42}$ (Ye') ½G+R |
$\Big\} S_4$ $S_1 \Big\{$
| $A_{11}$ (Mg') B+½G+R | $A_{12}$ (Yellow) G+R |
|---|---|
| $A_{21}$ (Mg') B+½G+R | $A_{22}$ (Green) G |
$\Big\} S_2$ $S_3 \Big\{$
| $A_{31}$ (Mg') B+½G+R | $A_{32}$ (Yellow) G+R |
|---|---|
| $A_{41}$ (Cyan) B+G | $A_{42}$ (Ye') ½G+R |
$\Big\} S_4$

COLOR FILTER ARRANGEMENT FOR CCD IMAGER

BACKGROUND OF THE INVENTION

1. Field of the Invention

The present invention relates generally to solid state image sensing devices, and more particularly to a solid state image sensing device used as the image sensing element in, for example, a color video camera, according to a frequency interleave system and operable in the field storage mode.

2. Description of the Prior Art

A solid state image sensing element in a known solid state image sensor of a frequency interleave system operable in the field storage mode, is formed by arranging a plurality of fundamental image sensing areas or regions 1, each of which is formed of four rows and 2 columns of picture element portions $A_{11}$, $A_{21}$, $A_{31}$, $A_{41}$, $A_{12}$, $A_{22}$, $A_{32}$, and $A_{42}$, as shown in FIG. 1. Columns (vertical direction) and rows (horizontal direction) are shown. The picture element portions $A_{11}$ to $A_{42}$ have color filters of predetermined spectral characteristics arranged thereon to allow the generation of color charge signals, each corresponding to the amount of light of a selected and predetermined wavelength of an optically picked-up image. In this kind of known solid state image sensor of frequency interleave system, operable in the field storage mode, the filters for the picture element portions $A_{11}$ and $A_{31}$ in the first column and in the first and third rows are made yellow, as, for example, shown in FIG. 2A. In other words, the color filters of the picture element portions $A_{11}$ and $A_{31}$ are selected to have such spectral characteristics as to allow light of green and red wavelengths to pass therethrough as illustrated in FIG. 3A. The picture element portions $A_{21}$ and $A_{42}$ in the first column, second row, and in the second column, fourth row are made cyan color picture element portions. In other words, the color filters of the picture element portions $A_{21}$ and $A_{42}$ are selected to have such spectral characteristics as to allow light of blue and green wavelengths to pass therethrough as illustrated in FIG. 3B. Further, the picture element portions $A_{41}$ and $A_{12}$, $A_{22}$ and $A_{32}$ in the first column, fourth row, and in the second column, first to third rows, are made green color picture element portions. In other words, the color filters of the picture element portions $A_{41}$, $A_{12}$, $A_{22}$, and $A_{32}$, are selected to have such spectral characteristics as to allow light of green wavelength to pass therethrough as illustrated in FIG. 3C.

Then, two adjacent picture element portions in the column direction (the vertical direction as shown in FIGS. 1 and 2) of the picture element portions $A_{11}$ to $A_{42}$ of the fundamental image sensing region 1 are combined to form a set of picture elements, from each of which is generated a charge signal ased on the optical image formed thereon.

Reference will be made to the example of FIG. 2A. In the first field, from the picture element portions $A_{11}$, $A_{21}$, $A_{12}$, and $A_{22}$ in the first and second rows, there is derived a modulation component R+B on the n-th line and from the picture element portions $A_{31}$, $A_{41}$, $A_{32}$, and $A_{42}$ in the third and fourth rows, there is derived a modulatation component R−B on the (n+1)th line. That is a yellow pick-up or video signal from the picture element portion $A_{11}$ in the first column, first row, having color component signals (G+R) of both green and red, and a cyan video signal from the picture element portion $A_{21}$ therebeneath, having color component signals (B+G) of both blue and green, are mixed together to yield a sum signal of the signals, expressed as $S_1=(G+R)+(B+G)=R+B+2G$. In like manner, video signals G of green derived from two vertically-adjacent green picture element portions $A_{12}$ and $A_{22}$ in the second column and its first and second rows are added together, thus yielding a sum signal expressed as $S_2=G+G=2G$. The subtraction of these signals S1 minus S2 results in a modulation component, $S_1-S_2=(R+B+2G)-2G=R+B$ on the n-th line. In the same way, a yellow signal (G+R) is derived from the picture element portion $A_{31}$ in the first column, third row, and is mixed with a green signal G derived from the green picture element portion $A_{41}$ therebeneath, thus yielding a sum signal expressed as $S_3=(G+R)+G=R+2G$. A green signal G is derived from the green picture element portion $A_{32}$ in the second column third row, and mixed with a cyan signal (B+G) derived from the picture element portion $A_{42}$ therebeneath, thus yielding a sum signal expressed as $S_4=G+(B+G)=B+2G$. Then, the subtraction of these signals $S_3$ minus $S_4$ yields a modulated component, $S_3-S_4=(R+2G)-(B+2G)=R-B$ on the (n+1)th line. Two rows of the elements in FIGS. 1–2D form one line of the raster).

In this way, the modulated component (R+B) on the n-th line and the modulated component (R−B) on the (n+1)th line are demodulated into red and blue signals 2R and 2B as the demodulated components of the interleaved signal. The same luminance signal $Y=R+B+4G$ is demodulated on the n-th line by the signals from the picture element portions $A_{11}$, $A_{21}$, $A_{12}$, and $A_{22}$ and on the (n+1)th line by the signals from the picture element portions $A_{31}$, $A_{41}$, $A_{32}$, and $A_{42}$.

In the second field, the picture element portions $A_{21}$, $A_{31}$; and $A_{22}$, $A_{32}$ in the second and third rows are combined to generate a modulated component R+B on the n'-th line. The picture element portions $A_{41}$, $A_{11}$; and $A_{42}$, $A_{12}$ on the fourth row and the first row of the next fundamental image sensing region 1 (not shown) located thereunder are combined to generate a modulated component (R−B) on the (n'+1)th line. Then, the demodulated components 2R and 2B and the luminance signal R+B+4G are obtained similarly.

The demodulated signals are processed by a matrix to produce color difference signals R−Y and B−Y.

FIG. 4 schematically shows an arrangement of a signal processing circuit for such processing. Referring to FIG. 4, there is shown a solid state image sensing element 11 which comprises a large number of the fundamental image sensing regions 1 described above, arranged in columns and rows. The luminance signal Y therefrom is supplied trough a low pass filter 12 and a luminance signal processing circuit 13 for the γ-correction to a color encoder 14. At the same time, a part of the luminance signal Y from the low pass filter 12 is supplied to a matrix circuit 15. Starting with the modulated signal components (R+B) and (R−B) from the solid state image sensing element 11, processing by a demodulating circuit 16, a delay line 17 with a delay time corresponding to one horizontal scanning period (1H), an adding circuit 18 and a subtracting circuit 19, there are produced red and blue signals R and B. These red and blue signals R and B are supplied to the matrix circuit 15, from which are derived the color difference signals R−Y and B−Y, which are then supplied to the color encoder 14. Thus, from its output terminal is produced the video output signals according to the NTSC system.

This solid state image sensor of frequency interleave system, operable in the field storage mode, needs the matrix circuit which generates the color difference signals R−Y and B−Y, since the demodulated components of the interleaved signal are obtained in the form of R and B signals..

This solid state image sensor has the disadvantage of luminance aliasing distortion. Specifically, for a white picked-up optical image formed on the image sensor, the green picture element portions $A_{l2}$, $A_{22}$, $A_{32}$, and $A_{4l}$ generate only the green signal component G, while the other picture element portions $A_{11}$ and $A_{3l}$ of yellow, or $A_{2l}$ and $A_{42}$ of cyan, generate the green and red signal components (G+R) or blue and green signal components (B+G). As a result, there is a difference in the luminance sensitivity for white light, between a group of the picture element portions $A_{l2}$, $A_{22}$, $A_{32}$, $A_{4l}$, and another group of the other picture element portions $A_{11}$, $A_{2l}$, $A_{3l}$, $A_{42}$, resulting in the luminance aliasing distortion corresponding to the arrangement pattern of the respective picture element portions. This causes the quality of the resulting picture to be deteriorated.

FIG. 2B shows another arrangement of the fundamental image sensing region 1 of the known image sensor of this kind. Referring to FIG. 2B, the picture element portions $A_{11}$, $A_{2l}$, $A_{3l}$, and $A_{42}$ are made white picture element portions, or the color filters thereof are made to have such spectral characteristics as to allow all light of blue, green and red wavelengths to pass therethrough, as shown in FIG. 3D. The picture element portions $A_{4l}$ and $A_{22}$ are made yellow picture element portions and the picture element portions $A_{l2}$ and $A_{32}$ are made cyan picture element portions. Similarly to the manner described above, for example, the modulated component (R+B) is generated on the n-th and n'-th lines and the modulated component (R−B) on the (n+1)th and (n'+1)th lines. Then, the addition and subtraction of these modulated components yield the demodulated components 2R and 2B of the interleaved signal and a component (3R+4G+3B) as the luminance signal Y.

Also in this case, the same matrix circuit as shown in FIG. 4 must be provided, in order to obtain the required color difference signals. Further, since there is a large difference in the luminance senstivity for the white light among the picture element portions $A_{l2}$, $A_{32}$ of cyan, $A_{22}$, $A_{4l}$, of yellow and $A_{11}$, $A_{2l}$, $A_{3l}$, $A_{42}$ of white, a luminance aliasing distortion occurs.

FIG. 2C shows still another example of the fundamental image sensing region 1. Referring to FIG. 2C, the picture element portions $A_{11}$, $A_{3l}$, and $A_{4l}$ are made as cyan picture element portions (B+G), the picture element portion $A_{2l}$ as the white picture element portion (B+G+R), the picture element portions $A_{l2}$, $A_{22}$, and $A_{32}$ as green picture element portions (G), and the picture element portion $A_{42}$ as the yellow picture element portion (G+R). In this case, a modulated component (2B+R) is generated on the n-th and n'-th lines and a modulated component (2B−R) on the (n+1)th and (n'+1)th lines. The addition and the subtracation of these modulated components yield demodulated components 4B and 2R of the interleaved signal and a luminance signal (R+3G+2B). Also in this case, the same matrix circuit as shown in FIG. 4 must be provided. Further, a luminance aliasing distortion is caused from a difference in the luminance sensitivity to white light, among the picture element portions.

FIG. 2D shows a further example of the fundamental image sensing region 1. The picture element portins $A_{11}$, $A_{2l}$, $A_{3l}$, are made as white picture element portions (B+G+R), the picture element portion $A_{4l}$ as cyan picture element portion (B+G), the picture element portion $A_{22}$ as green picture element portions (G), and the picture element portions $A_{l2}$, $A_{32}$ and $A_{42}$ as yellow picture element portions (G+R). In this case, a modulated component (2B+R) is generated on each of the n-th and n'-th lines and a modulated component (2B−R) on each of the (n+1)th and (n'+1)th lines. The addition and subtraction of these modulated components yield demodulated components 4B and 2R of the interleaved signal and a luminance signal (3R+4G+2B). Also in this example, the matrix circuit of FIG. 4 is necessary, and luminance aliasing distortion occurs.

The known solid state image sensors of an interleave system; operable in the field storage mode, requires the following requirements (i) to (vi).

(i)

(a) The picture element portions $A_{11}$ and $A_{3l}$ including their optical filters have equal spectral characteristics.

(b) The picture element portions $A_{l2}$ and $A_{32}$ including their optical filters have equal spectral characteristics.

(ii)

The signals R and B are modulated on the n-th and n'-th lines and their modulation phases are the same.

(iii)

The signals R and B are modulated on the (n+1)th and (n'+1)th lines and their modulation phases are different by 180°.

(iv)

The sum of the amount of light passing through the filters of the picture element portions $A_{2l}$ and $A_{22}$ is equal to the sum of the amount of light passing through the filters of the picture element portions $A_{4l}$ and $A_{42}$ so that in association with the requirement (i), an equal luminance output is generated on al lines.

(v)

(a) The transmissivity of the filter of the picture element portion $A_{11}$ is larger than that of the filter of the picture element portion $A_{l2}$.

(b) The transmissivity of the filter of the picture element portion $A_{2l}$ is larger than that of the filter of the picture element portion $A_{22}$.

(vi)

The filters of all the picture element portions $A_{11}$ to $A_{42}$ have equal transmissivity for the component G.

OBJECTS AND SUMMARY OF THE INVENTION

Accordingly, it is a general object of this invention to provide an improved solid state image sensor for use with a color video camera.

It is an object of this invention to provide a solid state image sensor in which color filters of picture element portions are selected to have such spectral characteristics as to reduce the difference in luminance sensitivity to white light among the picture element portions, to thereby reduce luminance aliasing distortion.

It is another object of this invention to provide a solid state image sensor in which a matrix circuit for generating color difference signals can be omitted, so that a signal processing circuit therefor can be simplified.

It is a further object of this invention to provide a solid state image sensor in which under a constant S/N (signal-to-noise) ratio, a dynamic range can be narrowed, whereas under the same dynamic range, the S/N ratio can be increased.

It is a still further object of this invention to provide a solid state image sensor having a solid state image sensing element which is a CCD (charge coupled device) or a MOS (metal oxide semiconductor) type.

According to one aspect of the present invention, there is provided a solid state image sensor of frequency interleave system, operable in the field storage mode, comprising:

(a) a fundamental image sensing region formed of eight picture element portions arranged in four rows and two columns on the same plane; and (b) color filters respectively formed on said picture element portions, wherein signals from two vertically-adjacent picture element portions of the fundamental image sensing region are combined to generate signals, which are then added and read out as a video signal, such color filters formed on a first group of said picture element portions in a first column, first to third rows, and the picture element portion in a second column, fourth row being made to have transmissivity to a green color light selected to be about 50% of those of said color filters formed on a second group of the other picture element portions.

These and other objects, features and advantages of the present invention will become apparent from the following detailed description of the preferred embodiments that are to be read in conjunction with the accompanying drawings, in which like reference numerals identify like elements and parts.

BRIEF DESCRIPTION OF THE DRAWINGS

FIGS. 3A to 3G are graphs showing spectral characteristics of color filters of the picture element portions, respectively;

DESCRIPTION OF THE PREFERRED EMBODIMENTS

Now, the present invention will hereinafter be described in detail with reference to the attached drawings.

A solid state image sensor of the invention can be formed of solid state image sensing element 11 of a CCD type, a MOS type or the like, and has picture element portions of the fundamental image sensing region of respective embodiments arranged as, for example, shown in FIGS. 5A to 5D. The respective embodiments in FIGS. 5A to 5D have the constructions corresponding to those of the picture element portions of the prior art sensors arranged as shown in FIGS. 2A to 2D, but have different spectral charactristics.

Figure 5A:
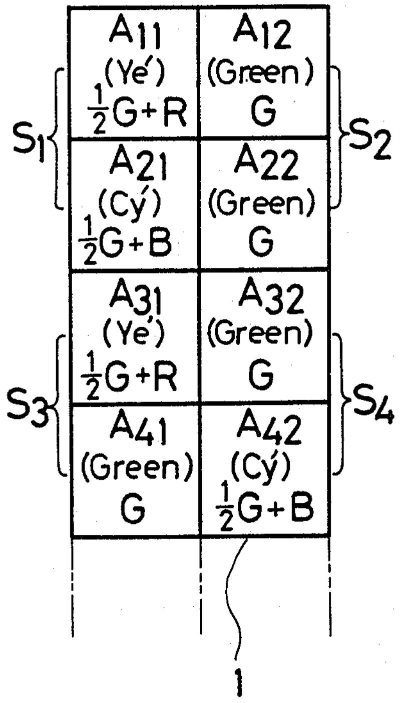
FIGS. 5A to 5D are respectively diagrams showing embodiments of the solid state image sensor according to the present invention, highlighting the pattern in which the picture element portions are arranged on the fundamental image sensing regions.

In the embodiment shown in FIG. 5A, the picture element portions $A_{11}$ and $A_{31}$ are made as picture element portions which have color filters of which the transmissivity for green wavelength is lower than that of a conventional yellow filter. The color transmission of these filters elements are hereinafter referred to as Ye' color. The picture element portions $A_{2l}$ and $A_{42}$ have color filters of which the transmissivity for green wavelength is lower than that of a conventional cyan filter, and are hereinafter referred to as the Cy' color, and other picture element portions $A_{12}$, $A_{22}$, $A_{32}$ and $A_{4l}$ are made as the green picture element portions, the same as those of FIG. 2A. The spectral charactristic of the filter of Ye' color of the picture element portions $A_{11}$ and $A_{3l}$, in its transmissivity for green light is selected to be, for example, 50% of those of the filters of the picture element portions $A_{l2}$, $A_{22}$, $A_{32}$ and $A_{41}$, as shown in FIG. 3E. Further, the spectral characteristic of the filter of Cy' color of the picture element portions $A_{2l}$ and $A_{42}$, in its transmissivity for green color is selected to be, for example, 50% of those of the picture element portions $A_{l2}$, $A_{22}$, $A_{32}$ and $A_{4l}$ as shown in FIG. 3F.

The solid state image sensor formed of the fundamental image sensing region 1 shown in FIG. 5A is adapted to generate a video signal by adding signals from two vertically-adjacent picture element portions (in the column direction) similarly to the known image sensor.

For example, in the first field, the addition of signal components $(\frac{1}{2}G+R)$ and $(\frac{1}{2}G+B)$ from the picture element portions $A_{11}$ and $A_{21}$ yields a sum signal expressed as $S_1=(\frac{1}{2}G+R)+(\frac{1}{2}G+B)=G+B+R$. In like manner, the addition of signal components from the picture element portions $A_{12}$ and $A_{22}$ yields a sum signal expressed as $S_2=2G$. The subtraction, $S_1-S_2$ of these signals $S_1$ minus $S_2$ yields a modulated component $(R+B-G)$ on the n-th line. The addition of signals $\frac{1}{2}G+R$ and G from the picture element portions $A_{31}$ and $A_{41}$ yields a sum signal expressed as $S_3=1\frac{1}{2}G+R$ and the addition of signals G and $(\frac{1}{2}G+B)$ from the picture element portions $A_{32}$ and $A_{42}$ yields a sum signal expressed as $S_4=G(\frac{1}{2}G+B)=1\frac{1}{2}G+B$. Then, the subtraction, $S_3-S_4$ yields a modulated component $(R-B)$ on the $(n+1)$th line. The addition and subtractioh of the modulated component $(R+B=G)$ of the n-th line and the modulated component $(R-B)$ of the (n 1)th line yield demodulated components $(2R-G)$ and $(2B-G)$ of the interleaved signal, respectively. In this case, the luminance signal becomes as $S_1+S_2=(R+3G+B)$.

For example, in the second field, the subtraction between the sum of the signals derivedfrom the picture element portions $A_{2l}$ and $A_{3l}$ in the first column, second and third rows, and the sum of the signals from the picture element portions $A_{22}$ and $A_{32}$ in the second column, second and third rows, yields a modulated component (R+B−G) on the n'-th line. Similarly, the subtraction between the sum of the signals from the picture element portions $A_{41}$ and $A_{11}$ in the fourth row and in the first row of another adjacent fundamental image sensing region 1 therebeneath, and the sum of the signals from the picture element portions $A_{42}$ and $A_{12}$ yields a modulated component (R−B) on the (n'+1)th line. Similarly, the addition and subtraction of these modulated components yield demodulated components (2R−G) and (2B−G) of the interleaved signal.

Figure 1:
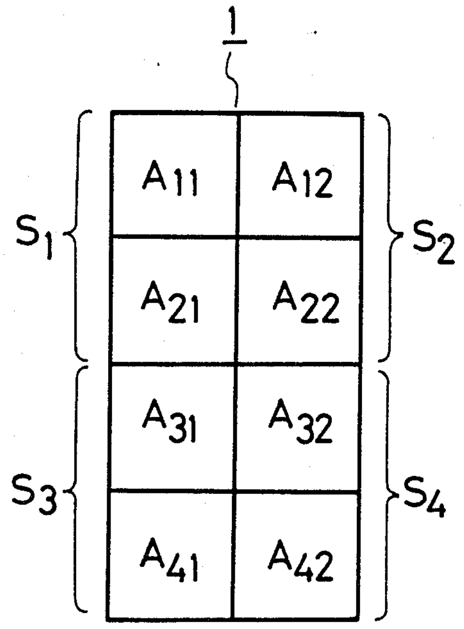
FIG. 1 is a diagram schematically showing a pattern in which a plurality of picture element portions are arranged in a fundamental image sensing region.
Figure 2A:
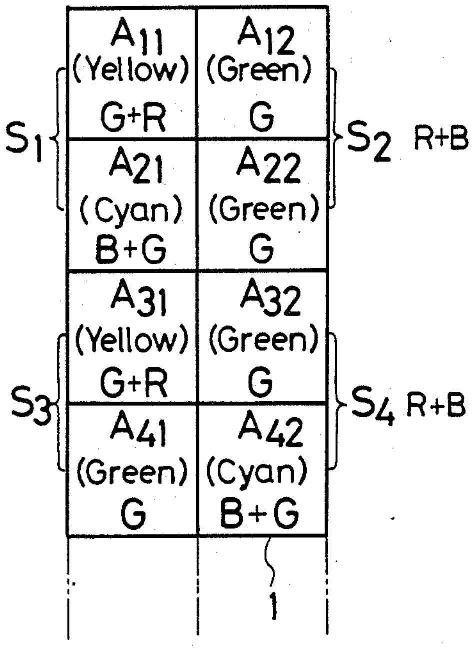
FIGS. 2A to 2D are, respectively, diagrams showing the patterns in which the picture element portions are arranged on the fundamental image sensing region of known solid state image sensors.
Figure 2B:
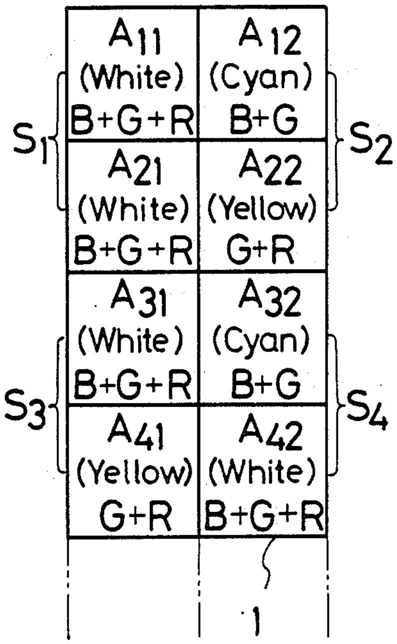
Figure 2C:
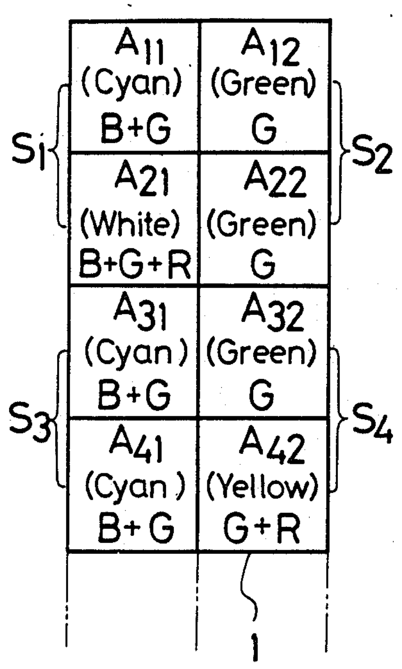
Figure 2D:
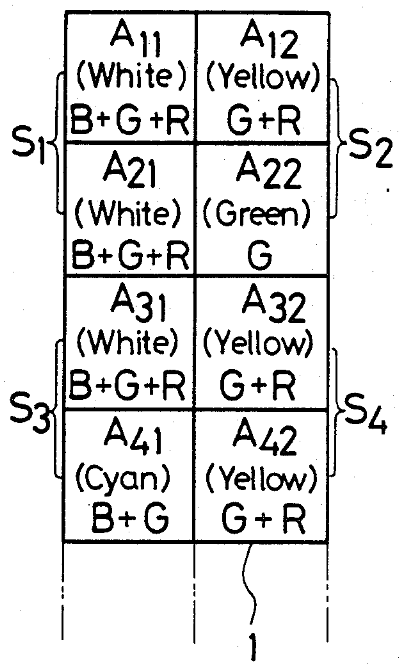
Figure 4:
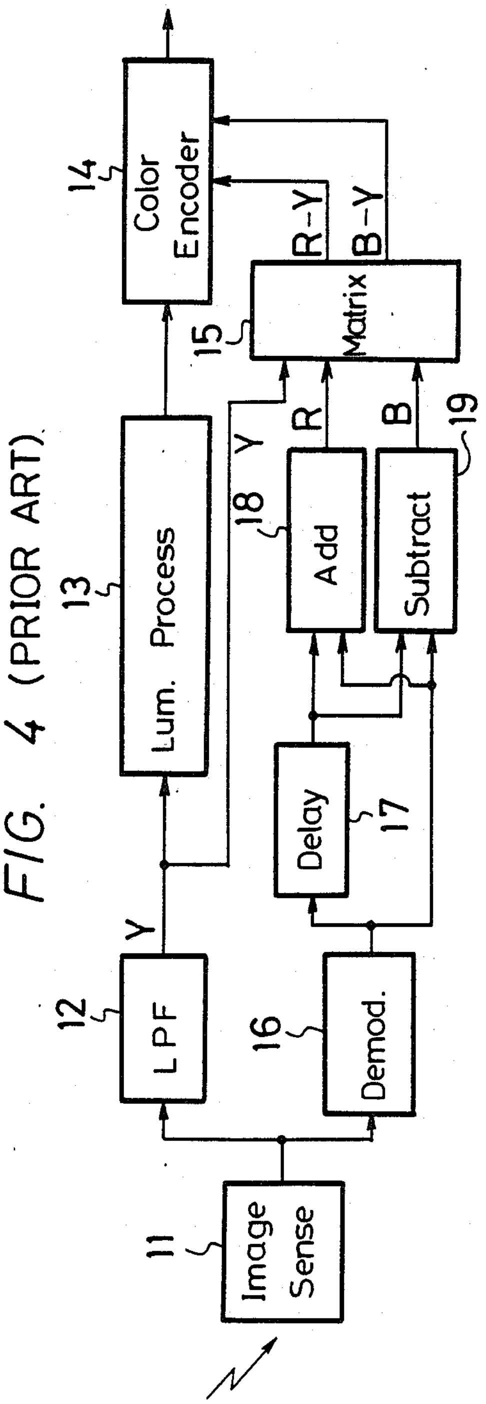
FIG. 4 is a block diagram showing an example of a signal processing circuit used in the known solid state image sensor.

As will be clear from comparing FIGS. 5A and 2A, since the demodulated components of the interleaved signal are frequency-multiplexed with each other in the form of (2R−G) and (2B−G) of signals which are nearly color difference signals containing G allowing for the optical characteristics of the practical solid state image sensing element, they can be directly used as chroma signals, so that the matrix circuit of FIG. 4 can be omitted and these signals can be processed with ease.

Figure 6:
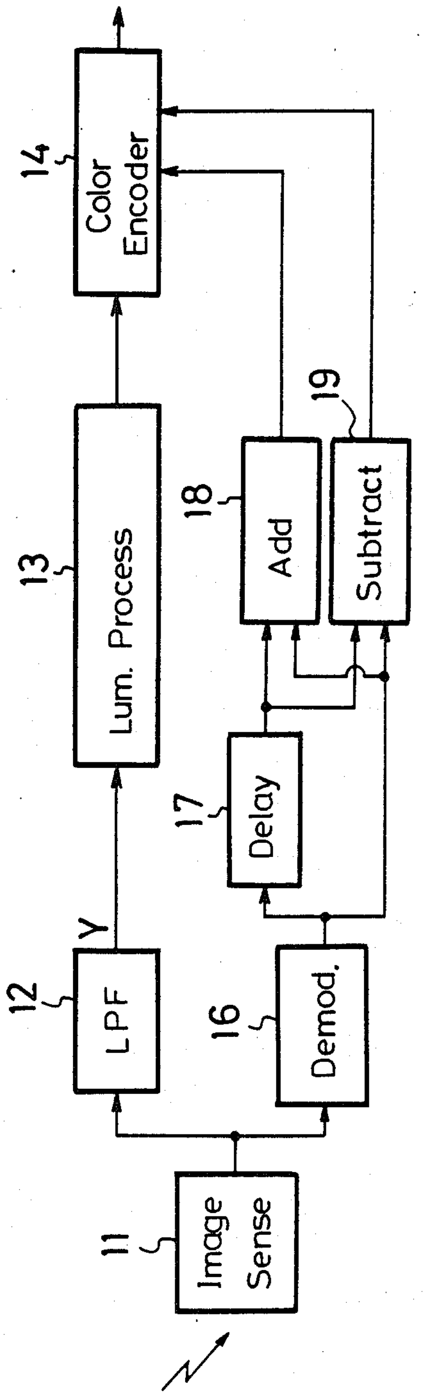
FIG. 6 is a block diagram showing a signal processing circuit used in the present invention.

FIG. 6 is a block diagram showing a signal processing circuit used in such case. In FIG. 6, like parts corresponding to those of FIG. 4 are marked with the same reference numerals and therefore need not be described. In this case, since the demodulated components of the interleaved signal are generated in the form of signals which are nearly color difference signals, it is possible to omit the matrix circuit by using these demodulated components just as they are.

According to the fundamental image sensing region 1 of the image sensor of the invention, the spectral characteristics, or transmissivities to green light of the picture element portions $A_{11}$, $A_{2l}$, $A_{3l}$ and $A_{42}$ are respectively selected to be 50% of those of the other picture element portions $A_{12}$, $A_{22}$, $A_{32}$ and $A_{41}$, with the result that the difference between the luminance sensitivities to the white light of the picture element portions can be reduced.

Figure 5B:
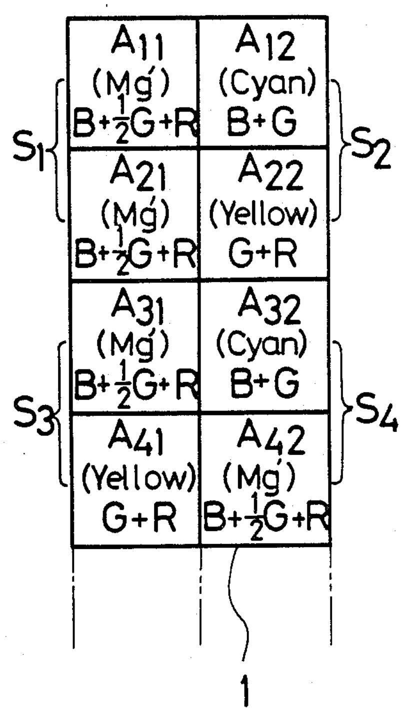

FIG. 5B shows another embodiment of the solid state image sensor according to the present invention. In this case, the picture element portions $A_{11}$, $A_{2l}$, $A_{3l}$ and $A_{42}$ are made as picture element portions which have the transmissivity for green wavelength lower than those of the corresponding white picture element portions of FIG. 2B and are hereinafter, referred to as Mg' color, picture element portions $A_{12}$ and $A_{32}$ are made as cyan picture element portions the same as those of FIG. 2B, and the other picture element portions $A_{22}$ and $A_{41}$ are made as yellow picture element portions. The spectral characteristic of the picture element portions $A_{11}$, $A_{2l}$, $A_{3l}$ and $A_{42}$ of Mg' color, or transmissivity thereof to green light is selected to be, for example, 50% of that of the picture element portions $A_{12}$, $A_{22}$, $A_{32}$ and $A_{41}$ as shown in FIG. 3G. Also in this case, the subtraction between the sum signal $S_1$ of the signals from the picture element portions $A_{11}$ and $A_{21}$, with the sum signal $S_2$ of the signals from the picture element portions $A_{12}$ and $A_{22}$, yields a modulated signal on the n-th line. The subtraction between the sum signal $S_3$ of the signals from the picture element portions $A_{3l}$ and $A_{4l}$ and the sum signal $S_4$ of the signals from the picture element portions $A_{32}$ and $A_{42}$ yields a modulated component on the (n+1)th line. In this case, the modulated component on the n-th line becomes (R+B−G) and the modulated component on the (n+1)th line becomes (R−B). Then, the addition and subtraction of these modulated components yields demodulated components (2R−G) and (2B−G) of the interleaved signal, respectively. The addition of, for example, $S_1+S_2$ yields a luminance signal (3R+3G+3B). In like manner, similar demodulated components and luminance signals are obtained on the n'-th and (n'+1)th lines.

Figure 5C:
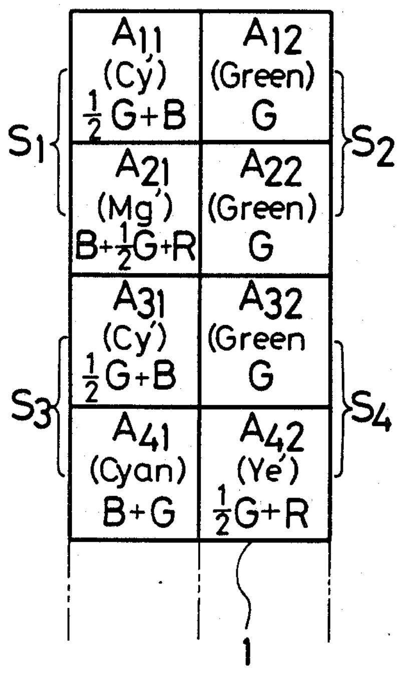

FIG. 5C shows the arrangement of the picture element portions of the fundamental image sensing region 1 in another embodiment of the image sensor according to the present invention. Also in this embodiment, the picture element portions $A_{11}$, $A_{2l}$, $A_{3l}$ and $A_{42}$ are made to have a transmissivity to green wavelength smaller than those of the other picture element portions $A_{12}$, $A_{22}$, $A_{32}$ and $A_{41}$. The fundamental image sensing region 1 of this embodiment corresponds to that of FIG. 2C. In this case, the picture element portions $A_{11}$ and $A_{31}$ are made as picture element portions of a Cy' color for which the amount of green light transmitted is smaller than that of the conventional cyan picture element portion, the transmissivity to green light is, for example, 50% of that of the green picture element portion, the picture element portion $A_{21}$ is made as a picture element portion of a Mg' color for which the amount of green light transmitted is smaller than that of the conventional white picture element portion, the transmissivity to green light is, for example, 50%. The picture element portion $A_{42}$ is made as a picture element protion of a Ye' color for which the amount of green light transmitted is smaller than that of the yellow picture element portions, the transmissivitY to green light is, for example, 50% of that of the picture element portion Green. In this case, a modulated component (2B+R−G) is generated on the n-th and n'-th lines and a modulated component (2B−R) is generated on the (n+1)th and (n'+1)th lines. The addition and subtraction of these modulated components yields demodulated components (4B−G) and (2R−G) of the interleaved signal, and a luminance signal (R+3G=2B).

Figure 5D:
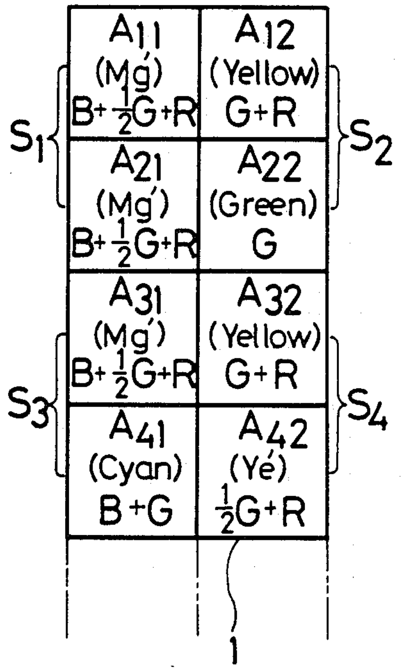

FIG. 5D shows the arrangement of the picture element portions of the fundamental image sensing region 1 in further embodiment of the image sensor according to the present invention. In this embodiment, the picture element portions are arranged corresponding to those of FIG. 2D. In this case, the picture element portions $A_{11}$, $A_{21}$ and $A_{31}$ are made to have Mg' color, and the picture element portion $A_{42}$ has the Ye' color. According to this image sensor, a modulated component (2B+R−G) is generated on the n-th and n'-th lines, and a modulated component (2B−R) is generated on the (n+1)th and (n'+1)th lines. The addition and subtraction of these modulated components yields demodulated components (4B−G) and (2R−G) of the interleaved signal and a luminance signal (3R+3G+2B).

According to any one of the embodiments shown in FIGS. 5A to 5D, since the demodulated components of the interleaved signal are obtained in the form of signals which are nearly the color difference signals, the signal processing circuit can be arranged without including the matrix circuit as shown in FIG. 6.

While the picture element portions $A_{11}$, $A_{21}$, $A_{31}$ and $A_{42}$ are made to have the transmissivity to green light of 50% of those of the other picture element portions $A_{12}$, $A_{22}$, $A_{32}$ and $A_{41}$, or $\frac{1}{2}$ G, as described above, the transmissivity is not limited to those described above but can be selected in a range from 0 to 100%, for example, 20% to 80% and color difference signals ($R-\alpha_1G$) and ($B-\alpha_2G$) can be generated as the demodulated components (where $\alpha_1$ and $\alpha_2$ represent positive constants).

Figure 7A:
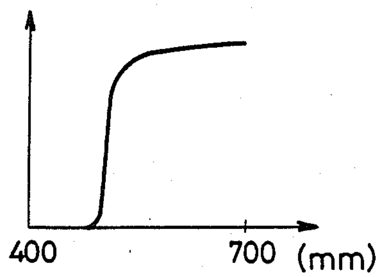
FIGS. 7A to 7C are graphs of spectral characteristics of dying agents to which reference will be made in explaining the making of the color filters, respectively.
Figure 7B:
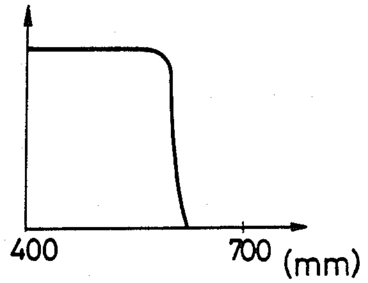
Figure 7C:
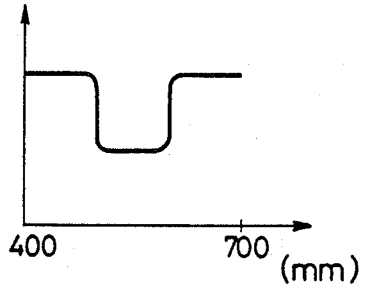

The filters having the above-mentioned spectral characteristics can be made as follows. A green color dyeing agent having a high transmissivity to light with a wavelength exceeding the green wavelength as shown in FIG. 7A, a cyan color dyeing agent having a high transmissivity to light with a wavelength lower than the green wavelength as shown in FIG. 7B, and Mg' color dyeing agent having such a transmissivity which shows a predetermined value for the green wavelength but shows a high value for red and blue wavelengths, as shown in FIG. 7C, are selectively mixed to manufacture filters having the spectral characteristics shown in FIGS. 3A to 3G for respective picture element portions. For example, the filter of spectral characteristic shown in FIG. 3C can be obtained by selectively combining the dyeing agents having the characteristics shown in FIGS. 7A and 7B, the filter of spectral characteristic shown in FIG. 3E by selectively combining the dyeing agents having the characteristics shown in FIGS. 7A and 7C, and the filter of spectral characteristic shown in FIG. 3F by selectively combining the dyeing agents having the characteristics shown in FIGS. 7B and 7C.

According to the present invention as described above, the signal processing circuit can be simplified and the luminance aliasing distortion can be decreased. Furthermore, since the amount of the green signal from the picture element portions $A_{11}$, $A_{21}$, $A_{31}$ and $A_{42}$ is reduced, the difference between the luminance sensitivities of the picture element portions $A_{11}$ to $A_{42}$ is reduced, with the result that the difference between the levels of the respective signals is reduced. Thus, under a constant S/N (signal-to-noise) ratio, the dynamic range of the image sensor can be reduced, or under the same dynamic range, the S/N ratio can be increased.

The above description is given on the preferred embodiments of the invention, but it will be apparent that many modifications and variations could be effected by one skilled in the art without departing from the spirit or scope of the novel concepts of the invention, so that the scope of the invention should be determined by the appended claims only.

We claim as our invention:

1. A solid state image sensor of a frequency interleave system operable in the field storage mode comprising;

a. a fundamental image sensing region formed of eight picture element portions arranged in four rows and two columns in a single plane; and b. color filters respectively formed on said picture element portions, wherein signals from two vertically-adjacent picture element portions of said fundamental image sensing region are combined to generate signals, which are then added and read out as a video signal, said color filters formed on a first group of said picture element portions in a first column, in its first to third rows, and said picture element portion in a second column, in its fourth row, being made to have transmissivity to a green color light selected to be about 50% of those of said color filters formed on a second group of the other picture element portions.

2. A solid state image sensor according to claim 1, wherein said transmissivity of said first group is selected in a range from 20% to 80% of those of said color filters formed on said second group of picture element portions.

3. A solid state sensor according to claim 1, wherein the filters for said first group comprises individual filters for transmitting (G/2+R) and (G/2+B), where R, G and B designate intensities of red, green and blue transmitted light, respectively, and in which G/2+R+G/2+B is substantially white light.

4. A solid state sensor according to claim 1, wherein said first group comprises individual filters for transmitting B, G and B designate intensities of red, green and blue transmitted light, respectively, and G/2 designates one-half the intensity of green light to form white light when added to R and B.

5. A solid state sensor according to claim 1, wherein said first group comprises individual filters for transmitting G/2+B, B+G/2+R, G/2+B and G/2+R, where intensities or red, green and blue transmitted light, respecitvely, and G/2 designates one-half the intensity of green light to form white light when added to R and B.

6. A solid state sensor according to claim 1, wherein said first group comprises individual filters for transmitting B+G/2+R and G/2+R, where intensities of red, green and blue transmitted light, respectively, and G/2 designated one-half the intensity of green light to form white light when added to R and B.

7. A method of deriving color signals from a solid state image sensor of a frequency interleave system operable in the field storage mode, comprising the steps of:

forming a solid state sensor with a plurality of fundamental image sensing regions, each having a plurality of picture element portions arranged in rows and columns in a single plane, and providing first and second sets of color filters for said picture elements, said first and second sets having the same number of filters, said filters each transmitting predetermined proportions of red, green and blue light incident on said filter, the filters of said first set of filters each being substantially transparent to green light and the other set of filters having a transmissivity for green light of approximately 50%.

* * * * *